United States Patent
Liu

(10) Patent No.: US 8,325,690 B2
(45) Date of Patent: Dec. 4, 2012

(54) METHOD FOR SUPERFRAME MANAGEMENT AND COORDINATOR THEREOF

(75) Inventor: Pei Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 648 days.

(21) Appl. No.: 12/487,984

(22) Filed: Jun. 19, 2009

(65) Prior Publication Data
US 2009/0257410 A1    Oct. 15, 2009

Related U.S. Application Data

(63) Continuation of application No. PCT/CN2007/071277, filed on Dec. 19, 2007.

(30) Foreign Application Priority Data

Dec. 19, 2006    (CN) .......................... 2006 1 0161749

(51) Int. Cl.
*H04W 4/00*    (2009.01)
*H04W 72/00*    (2009.01)

(52) U.S. Cl. ........................ 370/338; 455/450

(58) Field of Classification Search ........................ None
See application file for complete search history.

(56) References Cited

U.S. PATENT DOCUMENTS

| | | | |
|---|---|---|---|
| 5,806,007 A | 9/1998 | Raith et al. | |
| 5,809,015 A | 9/1998 | Elliott et al. | |
| 7,523,205 B1 * | 4/2009 | Sherman | 709/226 |
| 2002/0105970 A1 * | 8/2002 | Shvodian | 370/468 |
| 2002/0191583 A1 * | 12/2002 | Harris et al. | 370/345 |
| 2004/0160913 A1 * | 8/2004 | Kubler et al. | 370/328 |
| 2004/0253996 A1 * | 12/2004 | Chen et al. | 455/574 |
| 2005/0047386 A1 * | 3/2005 | Yi | 370/345 |

(Continued)

FOREIGN PATENT DOCUMENTS

| | | |
|---|---|---|
| CN | 1203724 | 12/1998 |
| CN | 1392693 | 1/2003 |
| CN | 1689283 A | 10/2005 |
| CN | 100558068 C | 11/2009 |

OTHER PUBLICATIONS

Written Opinion of the International Searching Authority in corresponding PCT Application No. PCT/CN2007/071277 (Mar. 27, 2008).

(Continued)

*Primary Examiner* — Hassan Phillips
*Assistant Examiner* — Eunsook Choi
(74) *Attorney, Agent, or Firm* — Leydig, Voit & Mayer, Ltd.

(57) ABSTRACT

A method and a coordinator of superframe management are disclosed. The method includes receiving, by a coordinator, a GTS request from a node; determining the type of the node; allocating GTS in an active period based on GTS characteristics carried in the GTS request when the node is determined as an energy restricted device; allocating GTS in an active period and an inactive period based on GTS characteristics carried in the GTS request when the node is determined as an energy unrestricted device. As can be seen from the method of the present invention, for an energy unrestricted device, allocated GTS may extend to an inactive period. Since the length of slots allocated to the energy unrestricted node is extended, the QoS of the energy unrestricted node is improved and guaranteed. Meanwhile, since the method of the present invention considers and makes full use of the inactive period in the superframe, the network throughput is improved significantly.

12 Claims, 3 Drawing Sheets

U.S. PATENT DOCUMENTS

| | | | |
|---|---|---|---|
| 2005/0059420 A1* | 3/2005 | Salokannel et al. ............ | 455/522 |
| 2005/0075084 A1* | 4/2005 | Salokannel et al. ............ | 455/126 |
| 2006/0050730 A1* | 3/2006 | Shvodian .................... | 370/458 |
| 2008/0232345 A1* | 9/2008 | Espina et al. ................ | 370/350 |
| 2009/0067389 A1* | 3/2009 | Lee et al. .................... | 370/336 |
| 2009/0111532 A1* | 4/2009 | Salokannel et al. ............ | 455/574 |

OTHER PUBLICATIONS

International Search Report in corresponding PCT Application No. PCT/CN2007/071277 (Mar. 27, 2008).

Std 802.15.4—Part 15.4: Wireless Medium Access Control (MAC) and Physical Layer (PHY) Specifications for Low-Rate Wireless Personal Area Networks (LR-WPANs), IEEE Standard for Information technology—telecommunications and information exchange between systems—Local and metropolitan area networks—Specific requirements, Oct. 1, 2003, Institute of Electrical and Electronic Engineers, New York, New York.

Koubaa et al., "GTS Allocation Analysis in IEEE 802.15.4 for Real-Time Wireless Sensor Networks," Technical Report, Dec. 20, 2005, Version 1.0, IPP Hurray!, Porto, Portugal.

* cited by examiner

<Prior Art>

<Prior Art>

<Prior Art>

<Prior Art>

METHOD FOR SUPERFRAME MANAGEMENT AND COORDINATOR THEREOF

CROSS-REFERENCE TO RELATED APPLICATIONS

This application is a continuation of International Application No. PCT/CN2007/071277, filed on Dec. 19, 2007, which claims the benefit of Chinese Application No. 200610161749.X, filed on Dec. 19, 2006, both of which are hereby incorporated by reference in their entireties.

FIELD OF THE INVENTION

The present invention relates to wireless personal area network (WPAN), more specifically, to a method for superframe management and coordinator thereof.

BACKGROUND

WPAN has two operation modes. One is a beacon-enabled mode, and the other is a non beacon-enabled mode. In the non beacon-enabled mode, all the nodes in the network contend for channels using an unslotted Carrier Sense Multiple Access with Collision Avoidance (CSMA/CA) algorithm. The advantage of the non beacon-enabled mode lies in its self-organization. However, such mode does not provide a time guarantee and Quality of Service (QoS) guarantee.

In the beacon-enabled mode, the network may periodically transmit a superframe to organize communication. In a superframe manner, non-contention slot is allocated in a superframe to conduct communication, a real-time communication and QoS can be achieved. Compared with the non beacon-enabled mode, the beacon-enabled mode can provide a better real-time communication and QoS guarantee.

Superframe structure is specified in a related standard. FIG. 1 illustrates an existing superframe structure. As shown in FIG. 1, the transmission interval between two consecutive beacon frames is denoted as Beacon Interval (BI). A superframe includes a beacon, an active period and an inactive period. The active period includes a beacon frame transmission period, a contention access period (CAP), and a contention free period (CFP). In the inactive period, nodes do not transmit data. They enter sleep mode to save energy. The nodes mentioned herein include energy restricted nodes and energy unrestricted nodes. Corresponding nodes are energy restricted devices and energy unrestricted devices.

The active period of a superframe is also referred to as a superframe duration (SD) which is divided into 16 time slots with equal length, labeled as 1-15 in FIG. 1. The parameters such as the duration of each slot and number of slots in the CAP are predetermined in the network and these parameters are broadcasted to all the nodes in the network in a beacon frame transmission period at the beginning of a superframe.

BI and SD are associated with Beacon Order and Superframe Order respectively. The calculation formulas are expressed as in equation (1) and equation (2).

$$BI = \alpha BaseSuperframeDuration \times 2^{BO} \quad (1)$$

$$SD = \alpha BaseSuperframeDuration \times 2^{SO} \quad (2)$$

where parameter aBaseSuperframeDuration is a minimum length of a superframe when SO=0. Parameter aBaseSuperframeDuration specified in the standard includes 960 symbols, where 1 symbol=4 bits.

As specified in the standard, in a CAP period, the nodes contend for channel to transmit data with a slotted CSMA/CA algorithm. However, if a Guaranteed Time Slots (GTS) mechanism is used, in the CAP, the node may transmit a request for allocating GTS to the network. After GTS is acquired successfully, the node may transmit data directly in the acquired GTS, which eliminates the need for channel contention with a CSMA/CA algorithm. The minimum length aMinCAPLength for a CAP is 440 symbols. However, if GTS is used, the length of the CAP can be less than the minimum length.

In one superframe, only at most 7 GTSes can be allocated in one superframe. Each GTS is constituted by several slots.

Currently, the management of a superframe includes GTS allocation, cancellation of the allocated GTS, readjustment of the position of the allocated GTS, etc.

To request for allocating GTS, a node may transmit a GTS request to a coordinator. The GTS request may carry GTS characteristics such as the length and the direction of the GTS requested, etc. Usually, the coordinator may reply an acknowledgement frame to the node after receiving the GTS request. After the coordinator receives the GTS request, the coordinator may first check if a current superframe has enough capacity according to the remaining length of CAP and the length of the requested GTS. If the capacity has not reached the maximum number of GTSes or the length of the requested GTS does not render the length of CAP to be less than the minimum length, which means that the superframe has enough capacity, then the coordinator may allocate GTS to the node according to the request. Usually, the coordinator allocates GTS according to a first-come-first-served policy.

The allocated GTS can be cancelled or the position of the allocated GTS can be adjusted, etc. FIG. 2a, 2b 2c is a first schematic, a second schematic and a third schematic of existing GTS management, respectively. The inactive period in the superframe is not shown in FIG. 2a-2c. As shown in FIG. 2a, suppose three allocated GTSes are GTS1, GTS2, and GTS3. GTS1 occupies slot 14 and slot 15. GTS2 occupies slot 10 to slot 13. GTS3 occupied slot 8 and slot 9.

If GTS2 is cancelled, an unoccupied slot may appear in the superframe, as shown in the shadow portion of FIG. 2b. As can be seen, the superframe becomes fragmental which might cause the waste of resources. To tackle this problem, GTS position needs to be readjusted, i.e., moves GTS3 right close to the GTS1 such that the GTS continuity is guaranteed.

Compared with the non beacon-enabled mode, although the beacon-enabled mode in a superframe fashion may improve the real-time of the transmission and QoS in a certain degree, a node is not distinguished as an energy restricted node or an energy unrestricted node. The current practice in management of superframe may assure a low power consumption of the energy restricted node but may not be able to improve and guarantee the QoS of the energy unrestricted node. The management of superframe is not flexible, which hardly meets the requirement of transmission quality of a service requiring for a demanding real-time performance. Moreover, the existing practice in management of superframe does not consider fully and make full usage of the inactive period in the superframe, thereby decreasing significantly the network throughput.

SUMMARY

A method for superframe management is provided according to one embodiment of the present invention. The method is able to improve and enhance the real-time of the transmission and QoS.

A coordinator for superframe management is further provided according to one embodiment of the present invention. The coordinator is able to improve and enhance the real-time of the transmission and QoS.

Specifically, the technical solutions according to the embodiments of the present invention are presented as follows.

A method for superframe management includes receiving, by a coordinator, a Guaranteed Time Slots GTS request from a node; determining the type of the node; and allocating GTS in an active period and an inactive period based on GTS characteristics carried in the GTS request when the node is determined as an energy unrestricted device.

A coordinator includes a receiving module, configured to receive a GTS request from a node; a determination module, configured to determine the type of the node; and an allocation module, configured to allocate GTS in an active period and an inactive period based on GTS characteristics carried in the GTS request received by the receiving module when the determination module determines that the node is an energy unrestricted device.

As can be seen from the foregoing technical solutions, an implementation of the present invention includes receiving, by a coordinator, a GTS request from a node; determining the type of the node; allocating GTS in an active period based on GTS characteristics carried in the GTS request when the node is determined as an energy restricted device; allocating GTS in an active period, or in an active period and an inactive period based on GTS characteristics carried in the GTS request when the node is determined as an energy unrestricted device. As can be seen from the method and coordinator of the present invention, for an energy unrestricted device, allocated GTS may extend to the inactive period. Because the length of slots allocated to the energy unrestricted node is extended, the QoS of the energy unrestricted node is improved and guaranteed. Meanwhile, since the method and the coordinator of the present invention consider and make full use of the inactive period in the superframe, the network throughput is improved significantly.

DETAILED DESCRIPTION

According to various embodiments of the present invention, the coordinator receives a GTS request from a node and determines the type of node. If the node is determined as an energy restricted device, GTS is allocated in an active period based on the GTS characteristics carried in the GTS request. If the node is determined as an energy unrestricted device, GTS is allocated in an active period, or in an active period and an inactive period based on the GTS characteristics carried in the GTS request.

The purposes, technical solutions and advantages concerning the embodiments of the present invention will become more readily appreciated by reference to the following description of the preferred embodiments, when taken in conjunction with the accompanying drawings.

Figure 1:
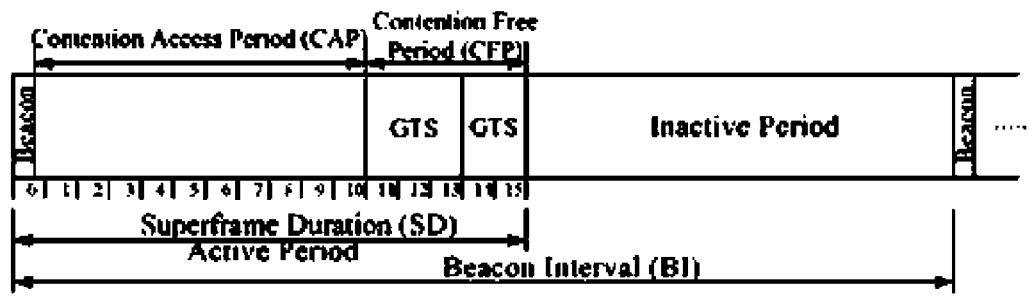
FIG. 1 is a schematic of an existing superframe structure.
Figure 2A:
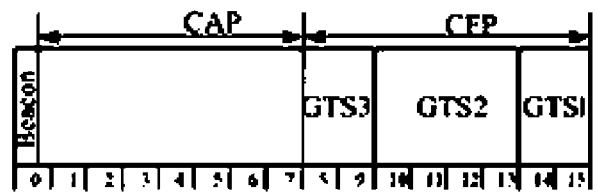
FIG. 2a is a first schematic of existing GTS management.
Figure 2B:
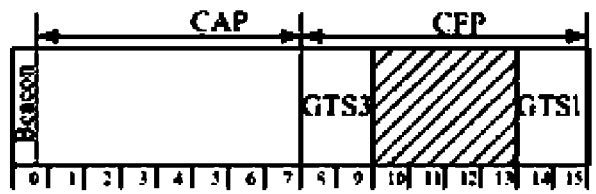
FIG. 2b is a second schematic of existing GTS management.
Figure 2C:
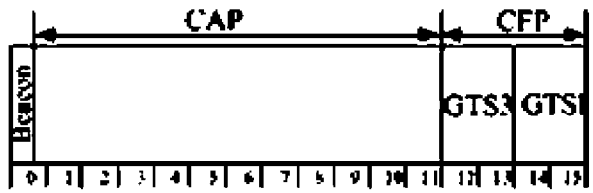
FIG. 2c is a third schematic of existing GTS management.
Figure 3:
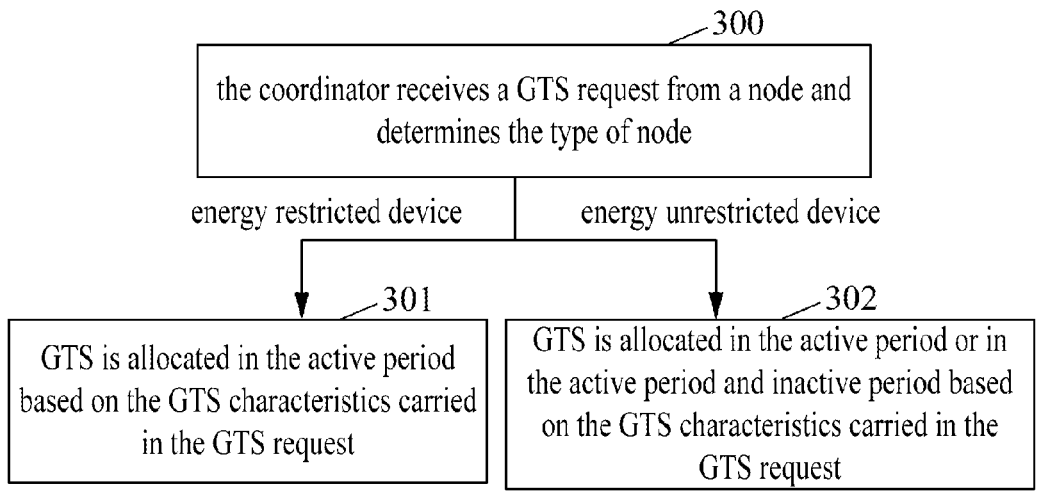
FIG. 3 is a flowchart according to one embodiment of the present invention.

FIG. 3 is a flowchart according to one embodiment of the present invention. As illustrated in FIG. 3, the flowchart presents the following steps.

Step 300: The coordinator receives a GTS request from a node and determines the type of node.

During network construction, information of all the nodes belonging to the coordinator, such as node parameters e.g. address information, type of node, etc., shall be recorded in the coordinator correspondingly. When the coordinator receives a GTS request from a node, the coordinator may search the node parameters it recorded for the type of node that matches the address of the node and may determine the type of node initiating the GTS request.

Step 301: If the node is determined as an energy restricted device, GTS is allocated in an active period based on the GTS characteristics carried in the GTS request.

According to the standard, the GTS characteristic carried in the GTS request includes information such as the length and direction of the requested GTS.

The step can be implemented with an existing GTS allocation method, which is omitted herein for brevity.

Step 302: If the node is determined as an energy unrestricted device, GTS is allocated in an active period, or in an active period and an inactive period based on the GTS characteristics carried in the GTS request.

In this step, for the energy unrestricted device, GTS can be allocated at a position in an active period adjacent to an inactive period. Alternatively, the allocated GTS may also expand to an inactive period. Since the time length of the slots allocated to the energy unrestricted node is expanded, the QoS of the energy unrestricted node is improved and guaranteed. Meanwhile, since the method of the present invention considers and makes full use of the inactive period in the superframe, the network throughput is enhanced significantly.

Figure 4:
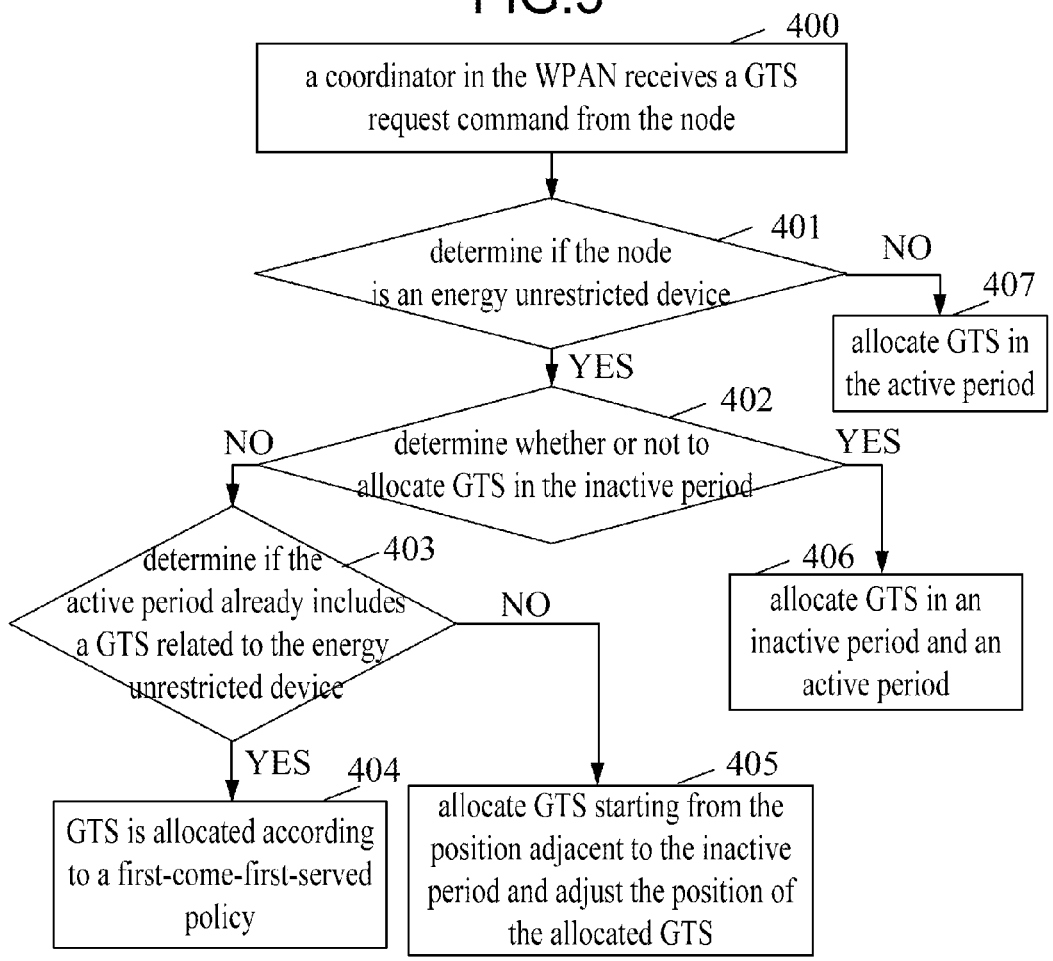
FIG. 4 is a flowchart of allocating GTS according to one embodiment of the present invention.

FIG. 4 is a flowchart of allocating GTS in WPAN according to one embodiment of the present invention. As illustrated in FIG. 4, the implementation includes the following steps.

Step 400: A coordinator in the WPAN receives a GTS request command from the node.

According to the standard, the GTS characteristic carried in the GTS request includes information such as the length of the requested GTS. Moreover, in this embodiment, the GTS request command also includes instruction indicating whether or not to allocate GTS in an inactive period.

Step 401: It is determined whether the node is an energy unrestricted device. If the node is an energy unrestricted device, step 402 is performed; otherwise, step 407 is performed.

In this step, nodes are distinguished so that different node may employ a different GTS allocation method. The implementation is detailed as the same in step 300, which is omitted herein for brevity.

Step 402: It is determined whether or not to allocate GTS in an inactive period. If it is determined to allocate GTS in an inactive period, step 406 is performed; otherwise, step 403 is performed.

In this step, the determination is made based on the GTS characteristics carried in the GTS request command. If the remaining length in the current active period is less than the length of the requested GTS, and the remaining length plus a predetermined length allowable for the terminal user to conduct transmission in an inactive period is equal to or longer the length of the requested GTS, then step 406 is performed.

Step 403: It is determined if the active period already includes a GTS related to the energy unrestricted device. If the active period already includes a GTS related to the energy unrestricted device, step 404 is performed; otherwise, step 405 is performed.

The coordinator in the WPAN knows about the status of the GTS it allocated, i.e. the coordinator can learn if it has allocated the GTS corresponding to energy unrestricted device in an active period from the record of its GTS allocation.

Step 404: GTS is allocated according to a first-come-first-served policy, and the procedure ends.

If the node corresponding to the GTS adjacent to the inactive period in the superframe is an energy unrestricted device, then, as long as this GTS has not been terminated or cancelled, the GTS requested by and allocated to other energy unrestricted devices cannot be placed in a position adjacent to the inactive period. In other words, for an energy unrestricted device, the allocation of the GTS adjacent to the inactive period follows the rule of first-come-first-served.

Step 405: GTS starting from the position adjacent to the inactive period is allocated and the position of the allocated GTS is adjusted. The procedure ends.

For the energy unrestricted device, GTS in the active period may preferably select the GTS adjacent to the inactive period. If the active period already includes a GTS which is allocated to the energy restricted device and which is adjacent to the inactive period, the position of the allocated GTS needs to be readjusted such that the slots number of the GTS adjacent to inactive period meets the GTS length required by a current energy unrestricted device. Meanwhile, the coordinator may inform each corresponding node of the adjusted GTS related information via a beacon frame.

Step 406: GTS in an inactive period and an active period is allocated. The procedure ends.

In the coordinator, the length allowable for the node to conduct transmission in the inactive period is predetermined. In order to facilitate the specification of a specific length used for transmission in the inactive period, slots number may be used to denote the specific length. The slot length equals the slots length in the active period. The length may also be expressed in the form of time.

In this step, GTS is allocated to the node according to the length of requested GTS carried in the GTS request command. First, the GTS is allocated in the active period adjacent to the inactive period. When the remaining length in the active period is less than the length of the requested GTS, and the remaining length plus the predetermined length allowable for the node to conduct transmission in the inactive period is longer than or equal to the length of the requested GTS, the remaining GTS is further allocated to the node in the inactive period.

Likewise, if the active period already includes a GTS which is allocated to the energy restricted device and which is adjacent to the inactive period, the position of the allocated GTS needs to be readjusted such that the slots number of the GTS adjacent to inactive period meets the GTS length in the active period required by a current energy unrestricted device. Meanwhile, the coordinator may inform each corresponding node of the adjusted GTS related information via a beacon frame.

It is noted that in order to ensure that the energy unrestricted device corresponding to the GTS allocated in the active period can perform transmission normally in the GTS allocated in the inactive period, the transition regarding this energy unrestricted device from active mode to low-power mode (sleep mode) must be deferred so as to take place in the GTS length allocated in the inactive period.

Step 407: GTS in the active period is allocated. This step can be implemented with the existing method, which is omitted herein for brevity.

Figure 5A:
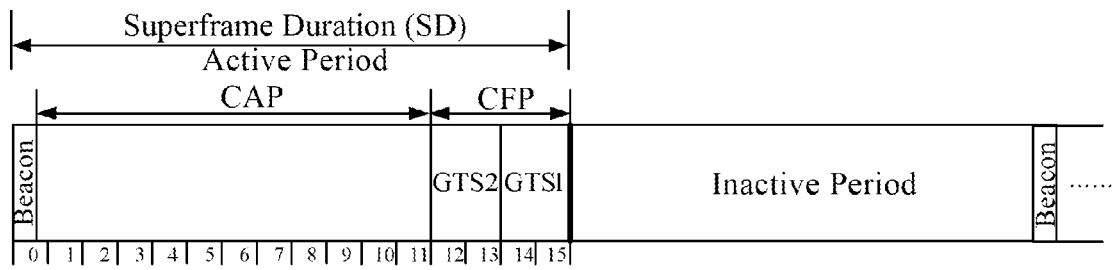
FIG. 5a is a first schematic of a change in superframe structure according to one embodiment of the GTS management of the present invention.
Figure 5B:
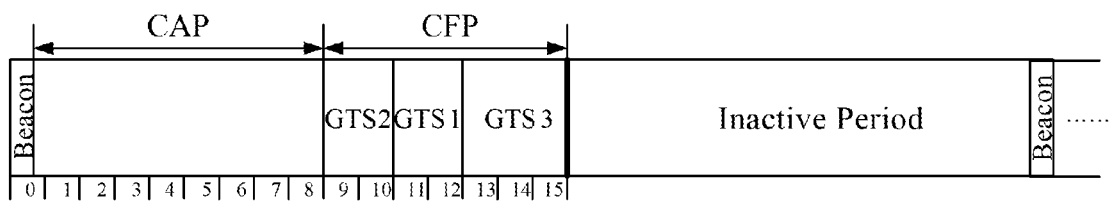
FIG. 5b is a second schematic of a change in superframe structure according to one embodiment of GTS management of the present invention.
Figure 5C:
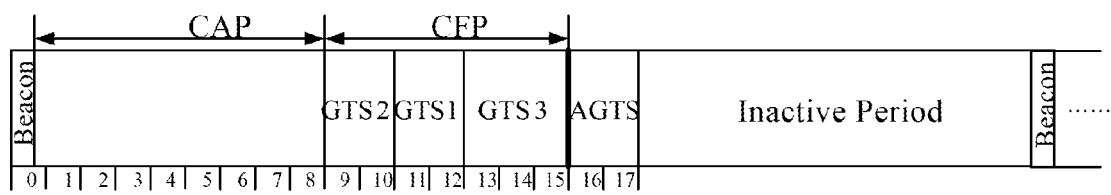
FIG. 5c is a third schematic of a change in superframe structure according to one embodiment of GTS allocation of the present invention.

FIG. 5*a*, FIG. 5*b*, and FIG. 5*c* is a first schematic, a second schematic, a third schematic of a change in superframe structure according to embodiments of GTS management of the present invention. In FIGS. 5*a*-5*c* bold solid lines are utilized to separate active periods and inactive periods. As illustrated in FIG. 5*a*, assume that GTS 1 and GTS 2 have been allocated to two energy restricted devices in an active period, respectively. The GTS1 takes up slot 14 and slot 15. The GTS2 takes up slot 12 and slot 13.

If some energy unrestricted device requests a GTS with 3 slots and instructs not to allocate the GTS in an inactive period, the coordinator may allocate GTS3 to the energy unrestricted device in the position adjacent to the inactive period. As illustrated in FIG. 5*b*, the GTS3 takes up slot 13 to slot 15 consecutively. Meanwhile, the position of the GTS1 and GTS2 is moved left for 3 slots. As illustrated in FIG. 5*b*, the adjusted GTS1 takes up slot 11 and slot 12 while the adjusted GTS2 takes up slot 9 and slot 10.

Assume that the predetermined length allowable for the node to conduct transmission in an inactive period is 5 slots. If a certain energy unrestricted device requests a GTS with 5 slots and instructs to allocate the GTS in the inactive period, the coordinator may allocate an AGTS to the energy unrestricted device in the inactive period when the active period is less than the requested GTS. As shown in FIG. 5*c*, assume there are 3 remaining slots in the active period. The coordinator may allocate a GTS3 to the energy unrestricted device in the position adjacent to the inactive period. As shown in FIG. 5*c*, GTS3 takes up slots 13 to 15 consecutively. (5−3)=2 slots left. Since the active period has only 3 slot left, when plus 5 slots allowable for the node to conduct transmission in the inactive period, the total slots are more than the length of the requested GTS, i.e. 5 slots. Therefore, (5−3)=2 slots are allocated in the inactive period which are the remaining slots unallocated in the active period, shown as AGTS in the FIG. 5*c*. The AGTS takes up slot 16 and 17. Meanwhile, the coordinator may move the position of the allocated GTS1 and GTS2 left for 3 slots. As shown in FIG. 5*c*, the adjusted GTS1 takes up slot 11 and slot 12, while the adjusted GTS2 takes up slot 9 and slot 10. As illustrate in FIG. 5*c*, although is allocated as 3 slots in the CFP period, in actual communication, the actual transmission length for the energy unrestricted device to which the GTS3 corresponds is 5 slots.

The above are merely exemplary embodiments of the present invention, which shall not be construed as a limitation to the scope of protection of the present invention. Any modification, equivalent, improvement, etc., made within the spirit and principle of the present invention fall with in the scope of protection of the present invention.

What is claimed is:
1. A method of superframe management, comprising:
receiving, by a coordinator, a Guaranteed Time Slots(GTS) request from a node;
determining the type of the node; and allocating GTS in an active period and an inactive period based on GTS characteristics carried in the GTS request when the node is determined as an energy unrestricted device.

2. The method of claim 1, wherein the GTS characteristics comprise at least the length of the requested GTS.

3. The method of claim 2, wherein after the node is determined as the energy unrestricted device and before the GTS is allocated in the active period and the inactive period, the method further comprises:
   determining whether or not to allocate GTS in the inactive period based on the GTS characteristics;
   allocating GTS in the active period and inactive period if it is determined to allocate GTS in the inactive period; and
   allocating GTS starting from a position in the active period adjacent to the inactive period in the superframe if it is determined not to allocate GTS in the inactive period.

4. The method of claim 3, wherein before allocating the GTS starting from a position adjacent to the inactive period in the superframe, the method further comprises:
   determining if the active period in the superframe already includes a GTS corresponding to the energy unrestricted device;
   allocating the GTS according to a first-come-first-served policy if the active period already includes a GTS corresponding to the energy unrestricted device; and
   allocating the GTS starting from a position adjacent to the inactive period in the superframe if the active period in the superframe does not include a GTS corresponding to the energy unrestricted device.

5. The method of claim 3, further comprising:
   adjusting the position of the allocated GTS if the active period in the superframe already includes GTS which is allocated to an energy restricted device and which is adjacent to the inactive period, such that the length of the GTS adjacent to the inactive period meets the length of a GTS in the active period required currently by the energy unrestricted device; and
   informing, at the same time, by the coordinator, each corresponding node of the adjusted GTS characteristics via a beacon frame in the superframe.

6. The method of claim 3, wherein allocating GTS in the active period and in the inactive period comprises:
   allocating a first portion of GTS to the node in the active period adjacent to the inactive period in the superframe and allocating a second portion of GTS to the node in the inactive period if a remaining length in the current active period is less than the length of requested GTS and the remaining length plus a predetermined length allowable for the node to conduct transmission in the inactive period is longer than or equal to the length of the requested GTS, wherein the sum of the length of the first portion of GTS and the length of the second portion of the GTS equals the length of the requested GTS.

7. The method of claim 4, further comprising:
   adjusting the position of the allocated GTS if the active period in the superframe already includes GTS which is allocated to an energy restricted device and which is adjacent to the inactive period, such that the length of the GTS adjacent to the inactive period meets the length of a GTS in the active period required currently by the energy unrestricted device; and
   informing, at the same time, by the coordinator, each corresponding node of the adjusted GTS characteristics via a beacon frame in the superframe.

8. The method of claim 2, wherein allocating GTS in the active period and in the inactive period comprises:
   allocating a first portion of GTS to the node in the active period adjacent to the inactive period in the superframe and allocating a second portion of GTS to the node in the inactive period if a remaining length in the current active period is less than the length of requested GTS and the remaining length plus a predetermined length allowable for the node to conduct transmission in the inactive period is longer than or equal to the length of the requested GTS, wherein the sum of the length of the first portion of GTS and the length of the second portion of the GTS equals the length of the requested GTS.

9. The method of claim 8, wherein before allocating the first portion of GTS in the active period adjacent to the inactive period in the superframe, the method further comprises:
   determining if the active period in the superframe already includes a GTS corresponding to the energy unrestricted device;
   allocating the GTS in the active period in the superframe according to a first-come-first-served policy if the active period already includes a GTS corresponding to the energy unrestricted device; and
   allocating the first portion of GTS to the node in the active period adjacent to the inactive period in the superframe if the active period in the superframe does not include a GTS corresponding to the energy unrestricted device.

10. The method of claim 9, further comprising:
    adjusting the position of the allocated GTS if the active period in the superframe already includes GTS which is allocated to an energy restricted device and which is adjacent to the inactive period, such that the length of the GTS adjacent to the inactive period meets the length of a GTS in the active period required currently by the energy unrestricted device; and
    informing, at the same time, by the coordinator, each corresponding node of the adjusted GTS characteristics via a beacon frame in the superframe.

11. The method of claim 1, further comprising:
    pre-storing node parameters in the coordinator; and
    wherein the step of determining the type of the node comprises:
    searching, by the coordinator according to address information of the node, the node parameters for the type of node which matches the address, wherein the type of node is the current node initiating the GTS request.

12. The method of claim 1, further comprising:
    allocating GTS in the active period if the node is determined as an energy restricted device.

* * * * *